Figure 1:
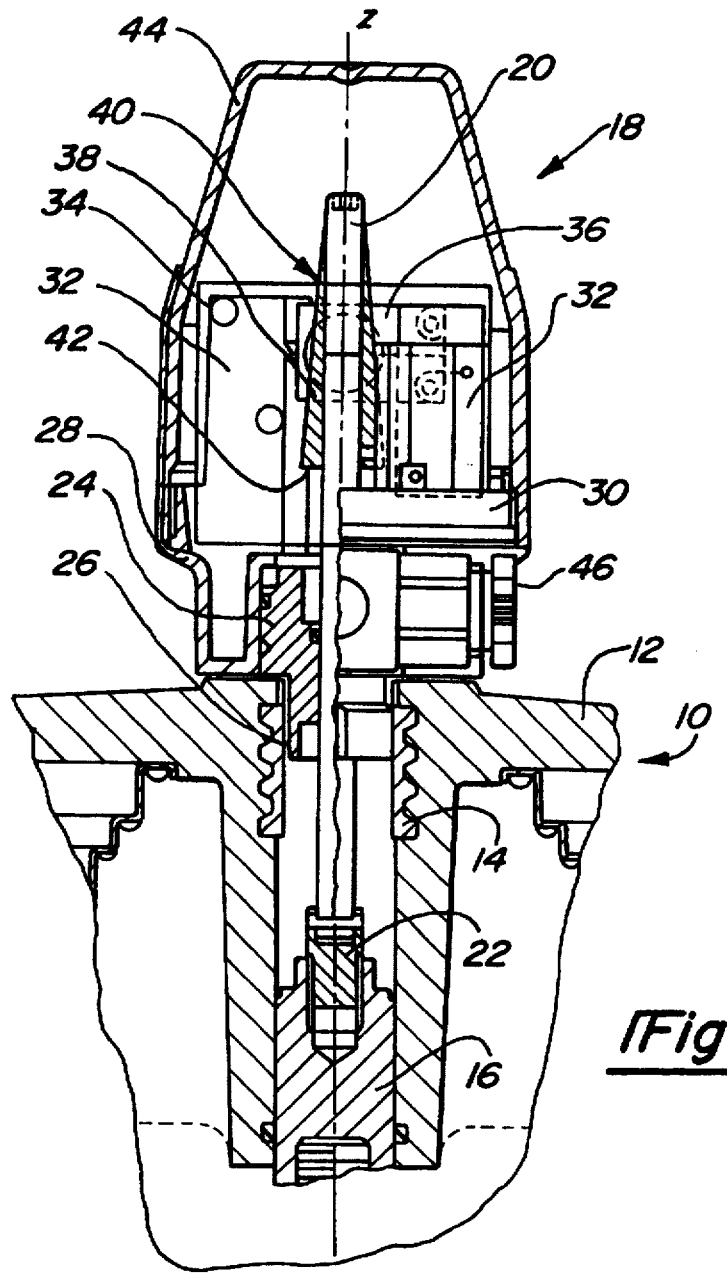

United States Patent [19]

Heiniger

[11] Patent Number: 5,706,855
[45] Date of Patent: Jan. 13, 1998

[54] DEVICE FOR MONITORING THE VALVE STROKE OF A DIAPHRAGM VALVE

[75] Inventor: Martin Heiniger, Schaffhausen, Switzerland

[73] Assignee: Georg Fischer Rohrleitungssysteme AG, Switzerland

[21] Appl. No.: 673,335

[22] Filed: Jun. 28, 1996

[30] Foreign Application Priority Data

Jun. 29, 1995 [CH] Switzerland ............... 01 907/95

[51] Int. Cl.⁶ ........................................ F16K 37/00
[52] U.S. Cl. .................... 137/554; 137/559; 251/282; 251/285
[58] Field of Search .................... 137/554, 559; 251/282, 285

[56] References Cited

U.S. PATENT DOCUMENTS

| | | | |
|---|---|---|---|
| 3,367,365 | 2/1968 | Stevens | 137/554 |
| 3,719,203 | 3/1973 | Wettre | 137/554 |
| 4,198,030 | 4/1980 | Jackson et al. | 137/554 |

*Primary Examiner*—A. Michael Chambers

*Attorney, Agent, or Firm*—Gifford, Krass, Groh, Sprinkle, Patmore, Anderson & Citkowski, P.C.

[57] ABSTRACT

In a device for monitoring the valve stroke of a valve that is pneumatically or hydraulically driven and comprises a valve body that is actuated by means of a pressure spindle (16), in particular, a diaphragm valve, a control spindle (20) is effectively connected to the pressure spindle (16). A control element (38) is arranged on the control spindle (20) in order to actuate a measuring element that serves as a signal transmitter for the valve position. The control element (38) has a control surface (40) that is inclined relative to the actuating axis (z) of the control spindle (20), and a displacement transducer (36) that measures the respective distance from the control surface (40) which corresponds to the valve position is arranged on the valve.

This device makes it possible to monitor continuously the valve stroke over the entire range of movement of the valve.

In order to automatically position the control element (38) during the initial actuation of the valve, a limit stop (24) that acts as a driver is arranged underneath the control element (38), with the control element (38) being clamped on the control spindle (20) so that it can be displaced.

10 Claims, 1 Drawing Sheet

DEVICE FOR MONITORING THE VALVE STROKE OF A DIAPHRAGM VALVE

The invention pertains to a device for monitoring the valve stroke of a valve that is pneumatically or hydraulically driven and comprises a valve body that is actuated by means of a pressure spindle; in particular, it pertains to a diaphragm valve in which a control spindle is effectively connected to the pressure spindle and in which a control element for actuating a measuring element that serves as a signal transmitter for the valve position is arranged on the control spindle.

So-called electric response sensors of the initially mentioned type are used for signaling the valve position of pneumatically or hydraulically driven displacement valves. In this case, end switches are actuated in the two respective end positions of the valve by means of a cam arranged on the control spindle such that an electronic signal that corresponds to the open or closed position of the valve is generated. This electronic signal is subsequently fed to a control system or a control panel, for example.

These known response sensors are only able to determine two positions of the valve. Although any intermediate position between the open and the closed position of the valve can be optically determined from the respective position of the control spindle, a continuous monitoring of the valve stroke over the entire range of movement of the valve in the form of an electronic signal that is proportional to the valve stroke and is fed to a control system or a control panel, for example, is not possible.

In light of these circumstances, the invention is based on the objective of developing a device of the initially mentioned type which makes it possible to continuously monitor the valve stroke over the entire range of movement of the valve.

According to the invention, this objective is attained by providing the control element with a control surface that is inclined relative to the actuating axis of the control spindle and arranging a displacement stroke transducer that measures the respective distance from the control surface which corresponds to the valve position of the valve.

Special embodiments as well as additional developments of the device according to the invention are set forth in the dependent claims.

Due to the inclined control surface of the control element, the distance of the control surface relative to the stroke transducer that is arranged on the valve in stationary fashion is changed when the control spindle is moved, with an electronic analog signal that is proportional to the valve stroke being generated at the output of the stroke transducer. Consequently, it is possible to continuously monitor the valve stroke over the entire range of movement of the valve.

According to one preferred embodiment of the device according to the invention, the control element is arranged on the control spindle concentric to its axis in the form of an essentially conical body with a conical control surface. In this case, the control element preferably is clamped on the control spindle in such a way that it can be displaced, i.e., the position can be changed without an excessively high expenditure of force.

According to one particularly practical embodiment of the device according to the invention, a limit stop that acts as a driver is arranged underneath the control element in order to position the control element on the control spindle. Due to this arrangement, the switching element is automatically displaced into its correct operating position when the valve is initially closed. If the membranes settle during the storage or the operation of the valve drive, the control element is automatically readjusted by means of the limit stop.

It is preferred to utilize an inductive stroke transducer. In comparison to mechanical devices, an inductive stroke transducer provides the advantage of contact-free operation without wear.

In order to additionally increase the functional reliability of the device, the control spindle is coupled to the pressure spindle in nonpositive fashion. A radial offset caused by the assembly as well as angular errors can be tolerated and are compensated by the coupling. In addition, the device preferably is realized in such a way that it can be screwed into the housing cover of a valve housing.

In order to protect the response sensor from becoming soiled, the response sensor is preferably enclosed by a transparent cover. This cover can be provided with a scale so as to optically determine the valve stroke.

Additional advantages, characteristics and details of the invention are described below with reference to one preferred embodiment that is illustrated in the figures; the figures schematically show:

FIG. 1, a partially sectioned side view of a response sensor, and

Figure 2:
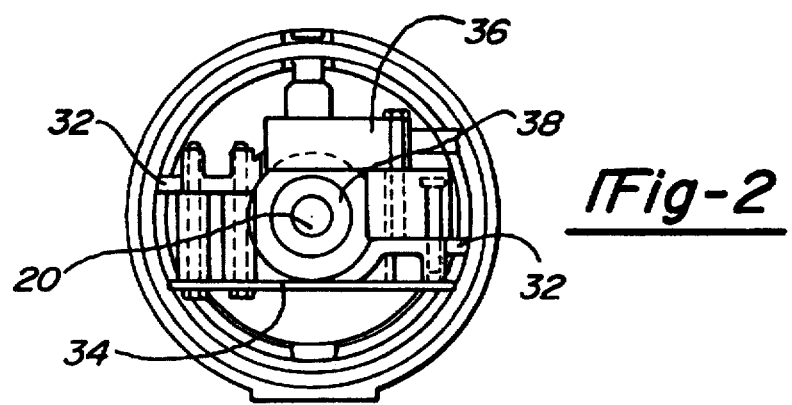

FIG. 2, a top view of the response sensor according to FIG. 1 without the cover and the connecting plug.

For the sake of clarity, the drawings only show a partial representation of the valve housing 10 of a diaphragm valve that is not illustrated in detail. According to FIG. 1, this valve housing comprises a housing cover 12, inside of which a threaded bushing 14 is centrally arranged. A response sensor 18 with a control spindle 20 that is connected to a pressure spindle 16 by means of a coupling element 22 is attached onto the valve housing 10. The response sensor 18 is screwed into the threaded bushing 14 via a centrally arranged screw 24 that has an external thread 26. In this case, the control spindle 20 extends through the screw 24 in the direction of the actuating axis z.

The screw 24 is surrounded by a carrier 28. Assembly walls 32 that are arranged parallel to the axis z protrude from the carrier 28. A printed-circuit board 34 as well as an inductive stroke transducer 36 of conventional design are arranged on the assembly walls.

A conical body 38 with a conical outer surface 40 that is tapered toward the free end of the control spindle 20 is clamped on the control spindle 20 concentric to the spindle axis z, so that it can be moved. The screw 24 lies underneath the conical body 38 and surrounds the control spindle 20 in such a way that it forms a limit stop for the base surface of the conical body 38 and is consequently able to act as a driver for the conical body 38.

If the control spindle 20 is moved in the direction z, the distance between the conical outer surface or control surface 40 and the inductive stroke transducer 36 changes proportionally to the valve displacement. A corresponding analog output signal that can be additionally utilized for monitoring, recording or control purposes is generated by the inductive stroke transducer 36. The printed-circuit board is equipped with two corresponding potentiometers for adjusting the zero point and consequently compensating the mechanical and electronic tolerances as well as monitoring the range of movement of different diaphragm valves with only one response sensor arrangement.

The response sensor 18 is provided with a transparent cover 44 that overlaps the carrier 28 and protects the response sensor 18 from becoming soiled. A channel with a connecting plug 46 is arranged laterally on the carrier 28 in order to lead the electronic connecting cable out of the response sensor 18.

FIG. 1 clearly shows that a movement of the conical body 38 into its final operating position takes place when the valve is initially closed, namely due to the driving effect of the screw 24 during the closing movement of the valve. This automatic adaptation of the conical body 38 to the valve movement also takes place if the membranes settle, i.e., the conical body 38 is automatically readjusted.

I claim:

1. Device for continuously monitoring the valve stroke of a valve that is pneumatically of hydraulic driven by creating an electronic signal which varies with the valve stroke position throughout movement of the valve between a fully closed and a fully open position which comprises a valve body that is actuated by means of a pressure spindle (16), in particular a diaphragm valve, wherein a control element (38) for actuating a measuring element that serves as a signal transmitter for electronically transmitting the position of the valve at each position of the valve between the fully closed and the fully open position of the valve is arranged so that the control element 38 is on the control spindle (20), characterized by the fact that the control element (38) has a control surface (40) that is inclined relative to the actuating axis (z) of the control spindle (20), and that said measuring element (36) measures the respective distance from the control surface 40 which corresponds to the position of the valve between its fully opened and its fully closed portion and which electronically transmits a signal which indicates the position of the valve between its fully opened and its fully closed position.

2. Device according to claim 1, characterized by the fact that the control element (38) is arranged on the control spindle (20) concentric to its axis (z) in the form of an essentially conical body with a conical control surface (40).

3. Device according to claim 1, characterized by the fact that the control element (38) is clamped on the control spindle (20) such that it can be moved.

4. Device according to one of claim 1, characterized by the fact that a limit stop (24) that acts as a driver is arranged underneath the control element (38) in order to position the control element (38) on the control spindle (20).

5. Device according to claim 1 and in which said measuring element comprises an inductive stroke transducer (36).

6. Device according to one of claim 1, characterized by the fact that the control spindle (20) is coupled to the pressure spindle (16) in nonpositive fashion.

7. Device according to one of claim 1, characterized by the fact that the part of the control spindle (20) which carries the control element (38) as well as the stroke transducer (36), is enclosed by a transparent cover (44).

8. Device according to claim 7, characterized by the fact that the cover (44) is provided with a scale so as to optically measure the valve stroke.

9. Device according to one of claim 7 or 8, characterized by the fact that the cover (44) of the response sensor (18) is arranged on the sleeve (24) so that it can be turned and locked.

10. The invention as defined in claim 1 and including a housing for said valve and a housing cover attached to said valve housing and in which said device can be screwed into said housing cover.

* * * * *